US009182568B2

(12) United States Patent
Uno (10) Patent No.: US 9,182,568 B2
(45) Date of Patent: Nov. 10, 2015

(54) LENS BARREL (71) Applicant: Panasonic Corporation, Osaka (JP)

(72) Inventor: Tetsuya Uno, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 158 days.

(21) Appl. No.: 14/141,658

(22) Filed: Dec. 27, 2013

(65) Prior Publication Data

US 2014/0185149 A1 Jul. 3, 2014

(30) Foreign Application Priority Data

Dec. 28, 2012 (JP) ................................ 2012-287112

(51) Int. Cl.
G02B 15/14 (2006.01)
G02B 7/10 (2006.01)
G03B 11/04 (2006.01)
G03B 17/04 (2006.01)

(52) U.S. Cl.
CPC .............. *G02B 7/102* (2013.01); *G03B 11/043* (2013.01); *G03B 17/04* (2013.01)

(58) Field of Classification Search
CPC .......... G02B 7/10; G02B 7/102; G02B 7/021; G02B 7/02
USPC ........................... 359/699, 811, 819, 822, 826
See application file for complete search history.

(56) References Cited

U.S. PATENT DOCUMENTS

| 5,886,832 A | 3/1999 | Ihara |
| 8,432,477 B2 | 4/2013 | Honsho et al. |
| 2011/0001872 A1* | 1/2011 | Honsho et al. ................ 348/362 |
| 2013/0215316 A1 | 8/2013 | Honsho et al. |

FOREIGN PATENT DOCUMENTS

| JP | 06-051178 A | 2/1994 |
| JP | 10-062670 A | 3/1998 |
| JP | 2011-013613 A | 1/2011 |

* cited by examiner

*Primary Examiner* — James Greece
(74) *Attorney, Agent, or Firm* — Renner, Otto, Boisselle & Sklar, LLP (57) ABSTRACT A lend barrel includes a first frame having a cam follower and a second frame having a cam engaged with the cam follower. The cam includes a first section extending in a rotational direction of the second frame, a second section continued with the first section and inclined to the rotational direction of the second frame, and a third section continued with the first section on a side opposite of the second section to the first section and inclined to the rotational direction. The cam follower includes a first surface arranged to face the first section of the cam, a second surface continuously formed with the first surface and inclined to the rotational direction, and a third surface continuously formed with the first surface on a side opposite of the second surface to the first surface and inclined to the rotational direction.

8 Claims, 9 Drawing Sheets

LENS BARREL

CROSS-REFERENCE TO RELATED APPLICATIONS

This application claims priority of Japanese Patent Application No.: 2012-287112 filed on Dec. 28, 2013, the content of which is incorporated herein by reference.

BACKGROUND

1. Technical Field

The present disclosure relates to a lens barrel.

2. Description of Related Art

Japanese Laid-open Publication 2011-13613 discloses a lens instrument provided with a lens barrel capable of being extended in three stages.

SUMMARY

It is an object of this disclosure to provide a lens barrel having further improved quality.

A lens barrel according to this disclosure includes a first frame having a cam follower, and a second frame having a cam which is engaged with the cam follower.

The cam has a first section which extends in the rotational direction of the second frame, a second section which is continuously formed with the first section and extends in an inclined manner with respect to the rotational direction of the second frame, and a third section which is continuously formed with the first section on a side opposite to the second section with respect to the first section and extends in an inclined manner with respect to the rotational direction of the second frame.

The cam follower has a first surface which is arranged so as to be opposed to the first section of the cam, a second surface which is continuously formed with the first surface and extends in an inclined manner with respect to the rotational direction of the second frame, and a third surface which is continuously formed with the first surface on a side opposite to the second surface with respect to the first surface and extends in an inclined manner with respect to the rotational direction of the second frame.

DETAILED DESCRIPTION

Hereinafter, an embodiment is explained by reference to drawings.

[1. Whole Constitution of Lens Barrel 1]

Figure 1:
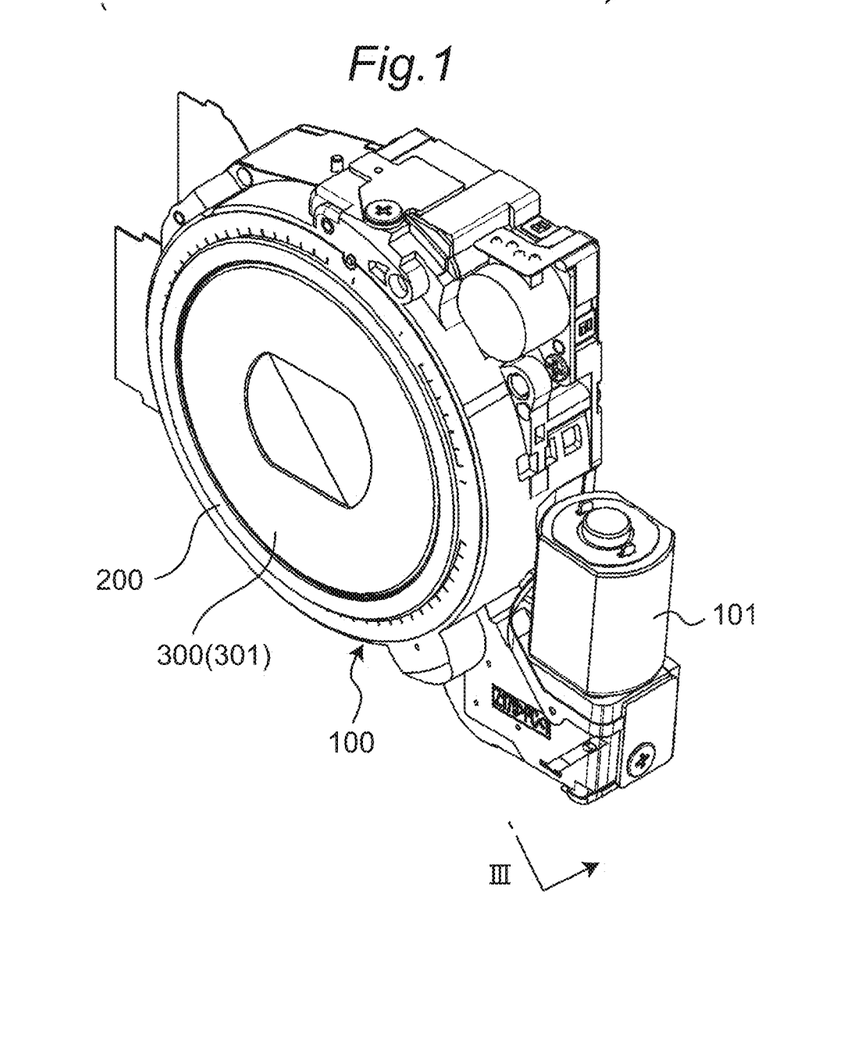
FIG. 1 is a perspective view of a lens barrel according to an embodiment.
Figure 2:
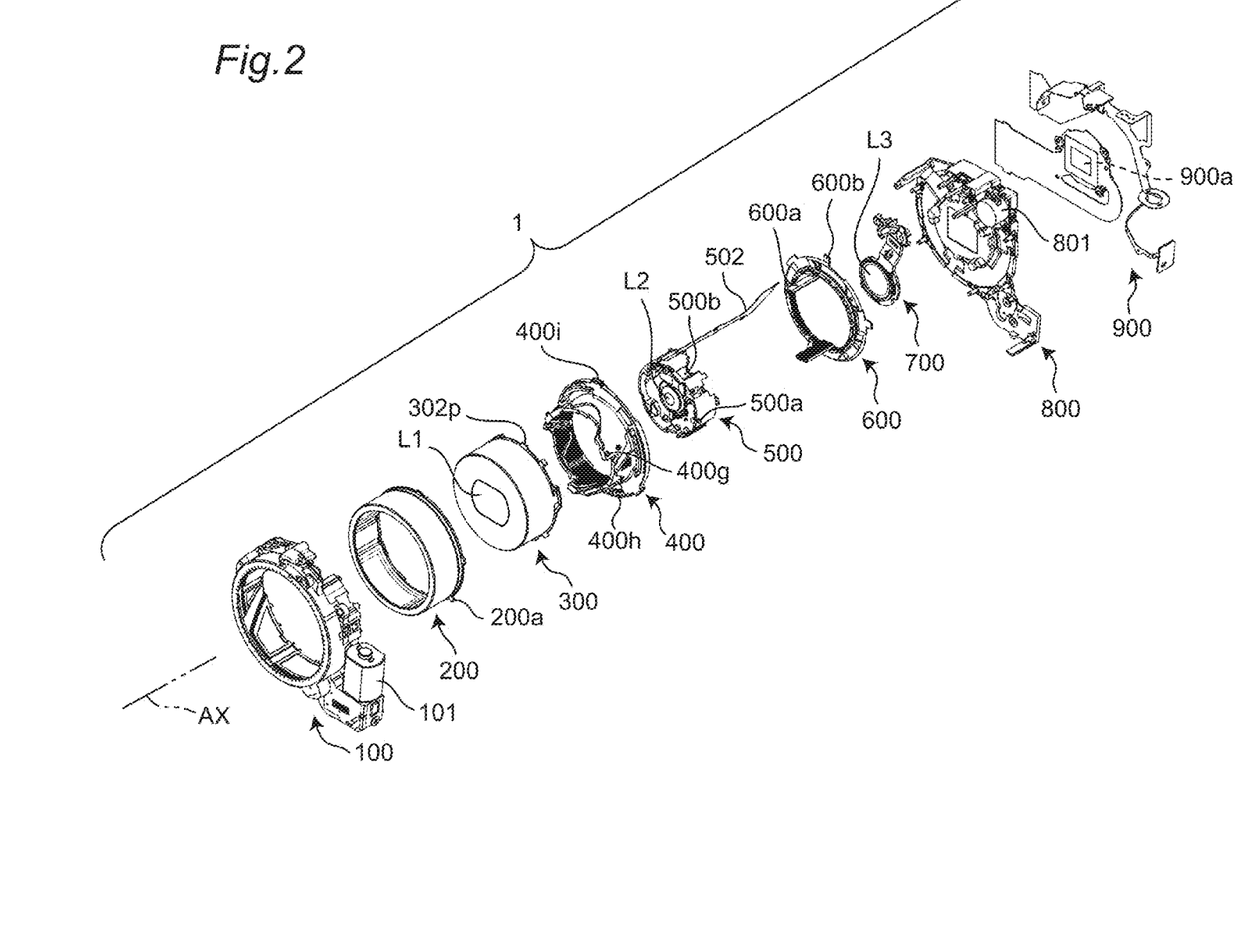
FIG. 2 is an exploded perspective view of the lens barrel according to the embodiment.

The whole schematic constitution of the lens barrel 1 is explained by reference to FIG. 1 to FIG. 4. FIG. 1 is a perspective view of the lens barrel 1. FIG. 2 is an exploded perspective view of the lens barrel 1.

Although the lens barrel 1 is an example of a lens barrel which is mounted on a digital still camera, the lens barrel 1 is not limited to such a lens barrel mounted on the digital still camera and can be mounted also on a film camera, a video camera, a mobile phone, a smart phone or the like.

The lens barrel 1 includes a plurality of lenses, and can perform zooming and focusing by changing the relative positions of the plurality of lenses. For this end, to change the positions of the plurality of lenses, the lens barrel 1 is configured to mechanically move the positions of lens frames which hold the plurality of lenses respectively.

In this embodiment, a two-stage collapsible lens barrel is exemplified as an example of the lens barrel 1. This disclosure is, however, also applicable to other types of lens barrels including a lens barrel which is collapsible in three stages.

The lens barrel 1 includes an imaging element. Accordingly, optical signals condensed by the plurality of lenses can be converted into electric signals.

The respective constitutions of the lens barrel 1 are explained by reference to FIG. 2. The lens barrel 1 includes: a fixing frame unit 100; a first group rectilinear unit 200; a first group unit 300; a cam frame 400; a second group unit 500; a second group rectilinear frame 600; a third group frame 700; a master flange unit 800; and an imaging element unit 900.

A rectilinear groove (not shown in the drawing) is formed on an inner peripheral surface of the fixing frame unit 100, and the rectilinear groove is engaged with a rectilinear key 200a provided to the first group rectilinear unit 200. The rectilinear groove is a groove formed along the direction parallel to an optical axis AX. Due to such a constitution, the first group rectilinear unit 200 is movable in the optical axis direction relative to the fixing frame unit 100, while the rotation of the first group rectilinear unit 200 relative to the fixing frame unit 100 is restricted.

A rectilinear groove (not shown in the drawing) is formed on an inner peripheral surface of the first group rectilinear unit 200, and the rectilinear groove is engaged with a rectilinear key 302p provided to the first group unit 300. Due to such a constitution, the first group unit 300 is movable in the optical axis direction relative to the first group rectilinear unit 200, while the rotation of the first group unit 300 relative to the first group rectilinear unit 200 is restricted.

A cam groove (not shown in the drawing) is formed on an inner peripheral surface of the first group unit 300, and the cam groove is engaged with a cam follower 400g of the cam frame 400. The first group unit 300 holds a first lens group L1. Due to such a constitution, when the cam frame 400 rotates, the first group unit 300 advances or retracts while rotating relative to the cam frame 400.

A cam groove (not shown in the drawing) is formed on an inner peripheral surface of the cam frame 400, and the cam groove is engaged with a cam follower 500a of the second group unit 500. Due to such a constitution, when the cam frame 400 rotates, the second group unit 500 advances or retracts while rotating relative to the cam frame 400.

Further, the cam frame 400 includes a cam follower 400i which is engaged with a cam groove (not shown in the drawing) formed on the inner peripheral surface of the fixing frame unit 100. A gear 400h is formed on an outer periphery of the cam frame 400. The cam frame 400 rotates in the inside of the fixing frame unit 100 by receiving a force from a gear of a zoom motor 101 of the fixing frame unit 100. Due to such a constitution, when the cam frame 400 is rotated in the inside of the fixing frame unit 100, the cam frame 400 advances or retracts in the inside of the fixing frame unit 100 due to the relationship between the cam follower 400*i* and the cam groove (not shown in the drawing).

The second group unit 500 holds a second lens group L2. The second group unit 500 includes a shutter, a diaphragm, and an OIS (Optical Image Stabilization Unit). The second group unit 500 includes an actuator for operating the shutter, an actuator for operating a diaphragm, and an actuator (including a sensor) for operating the OIS. A flexible printed circuit board 502 is provided for electrically connecting these actuators and a control circuit arranged outside the lens barrel 1. The flexible printed circuit board 502 is also fixed to a master flange unit 800. The second group unit 500 is explained in detail later.

Rectilinear projections 600*a* are formed on the second group rectilinear frame 600, and the rectilinear projections 600*a* are engaged with rectilinear grooves 500*b* formed on an outer periphery of the second group unit 500. Due to such a constitution, the second group rectilinear frame 600 restricts the rotation of the second group unit 500.

Rectilinear keys 600*b* are formed on an outer periphery of the second group rectilinear frame 600. The rectilinear keys 600*b* of the second group rectilinear frame 600 are engaged with rectilinear grooves (not shown in the drawing) formed on the fixing frame unit 100. Further, the second group rectilinear frame 600 is engaged with the cam frame 400 by a bayonet mechanism 600*c* (see FIG. 3 and FIG. 4). Due to such a constitution, the second group rectilinear frame 600 is rotatably held on the cam frame 400 while the movement of the second group rectilinear frame 600 relative to the cam frame 400 in the optical axis direction is restricted. When the cam frame 400 moves in the inside of the fixing frame unit 100, the second group rectilinear frame 600 moves relative to the fixing frame unit 100 while the rotation of the second group rectilinear frame 600 relative to the fixing frame unit 100 is restricted.

The third group frame 700 holds a third lens group L3. The third group frame 700 is supported on guide poles 800*a* of the master flange unit 800 (see FIG. 4). The third group frame 700 moves in the optical axis direction by being driven by a focusing motor 801. The fixing frame unit 100 is fixed to an imaging object side of the master flange unit 800, and an imaging element unit 900 is fixed to a non-imaging-object side of the master flange unit 800.

Figure 3:
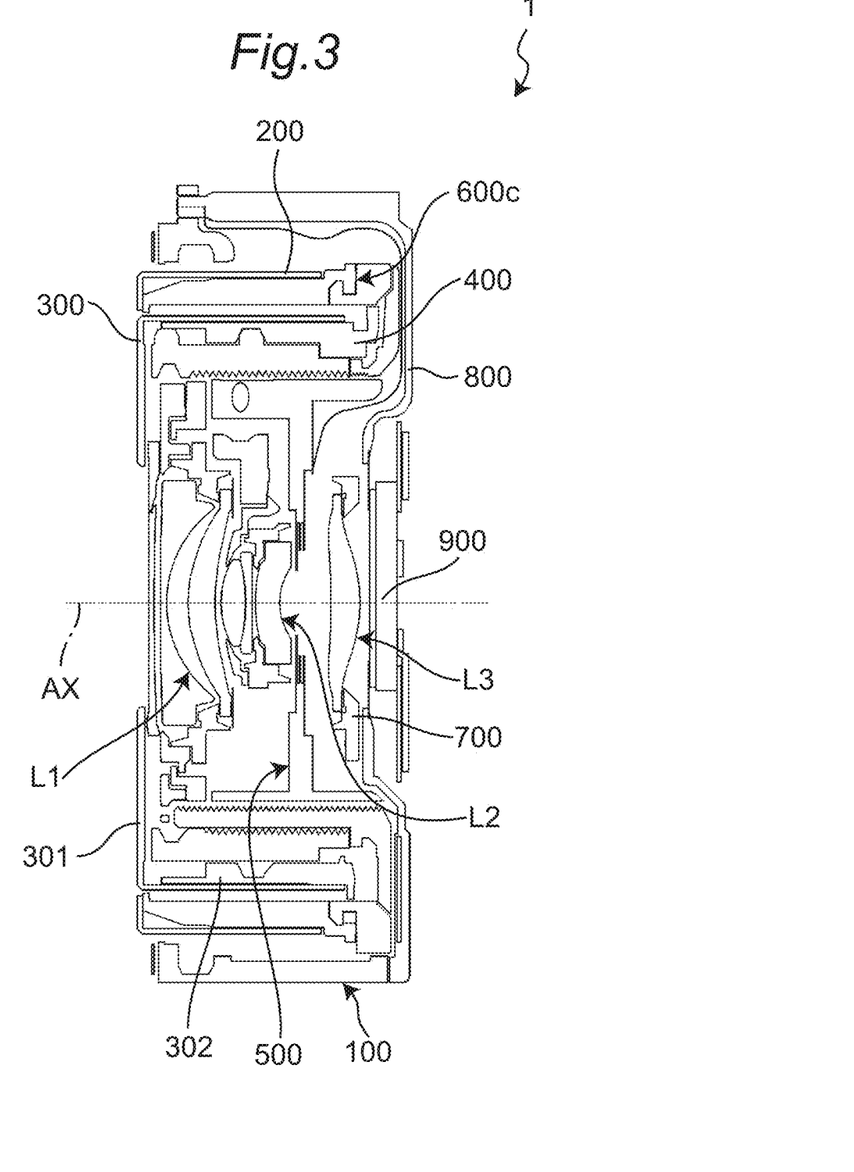
FIG. 3 is a cross-sectional view taken along a line III-III in FIG. 1 (showing the lens barrel in a stored state)
Figure 4:
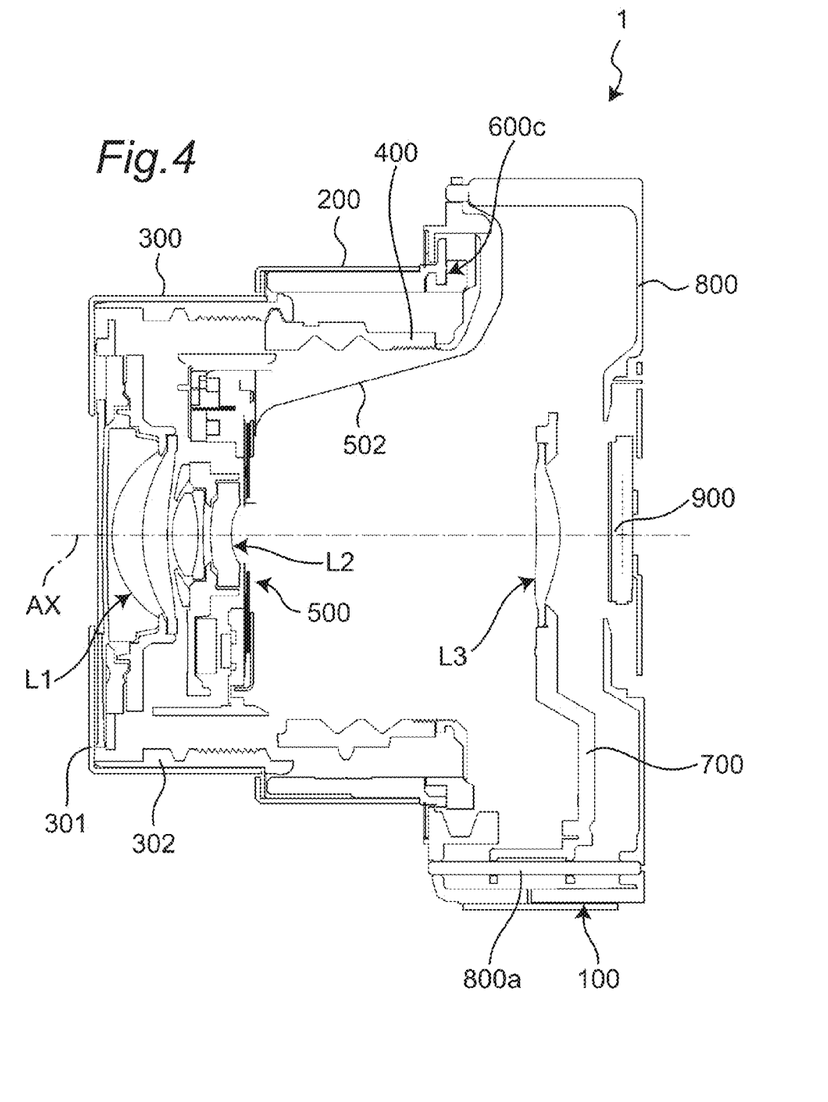
FIG. 4 is a cross-sectional view of the lens barrel in a telescopic state.

FIG. 3 and FIG. 4 are cross-sectional views of the lens barrel 1. FIG. 3 shows the lens barrel 1 in a stored state (collapsed state), while FIG. 4 shows the lens barrel 1 in a most extended state (telescopic state).

To explain this embodiment by reference to FIG. 3 and FIG. 4, it is understood that the lens barrel 1 is extendable in two stages. When the zoom motor 101 rotates the cam frame 400 relative to the fixing frame unit 100, the cam frame 400 advances or retracts in the optical axis direction relative to the fixing frame unit 100. When the cam frame 400 advances or retracts in the optical axis direction, the first group rectilinear unit 200 advances or retracts in the optical axis direction along with the cam frame 400 by the bayonet mechanism 600*c*. When the cam frame 400 relatively rotates on an inner peripheral side of the first group rectilinear unit 200, the first group unit 300 advances or retracts in the optical axis direction.

The second group unit 500 advances or retracts in the optical axis direction on an inner peripheral side of the cam frame 400 by the cam frame 400 and the second group rectilinear frame 600.

The third group frame 700 is supported on a guide pole 800*a* which is fixed to the master flange unit 800. The third group frame 700 advances or retracts in the optical axis direction by being driven by the focusing motor 801.

[2. Whole Constitution of First Group Unit 300]

Hereinafter, the constitution of the first group unit 300 is explained in detail by reference to drawings.

Firstly, the constitution of the first group unit 300 is explained by reference to FIG. 5. A decoration ring 301 has an opening portion 301*b*. The decoration ring 301 is an external appearance forming member made of metal which is arranged on a side closest to an imaging object, and is fixed to a base frame (first group frame) 302. A space is defined between the decoration ring 301 and the base frame 302, barrier blades 303 and a cam ring 304 are operable in the inside of the space.

The opening portion 301*b* is formed on the decoration ring 301. The opening portion 301*b* is an aperture through which an effective optical flux for imaging passes.

Since the decoration ring 301 is made of metal, there may be a case where a light which is incident from the opening portion 301*b* is reflected on an inner surface of the decoration ring 301 and passes between the cam ring, the barrier blades and the like thus generating a leaked light. Accordingly, a reflection prevention portion is formed on the inner surface of the decoration ring 301. As one example of the reflection prevention portion, black painting may be applied to the whole inner surface of the decoration ring. Due to such a constitution, a leakage of a light can be reduced.

Figure 5:
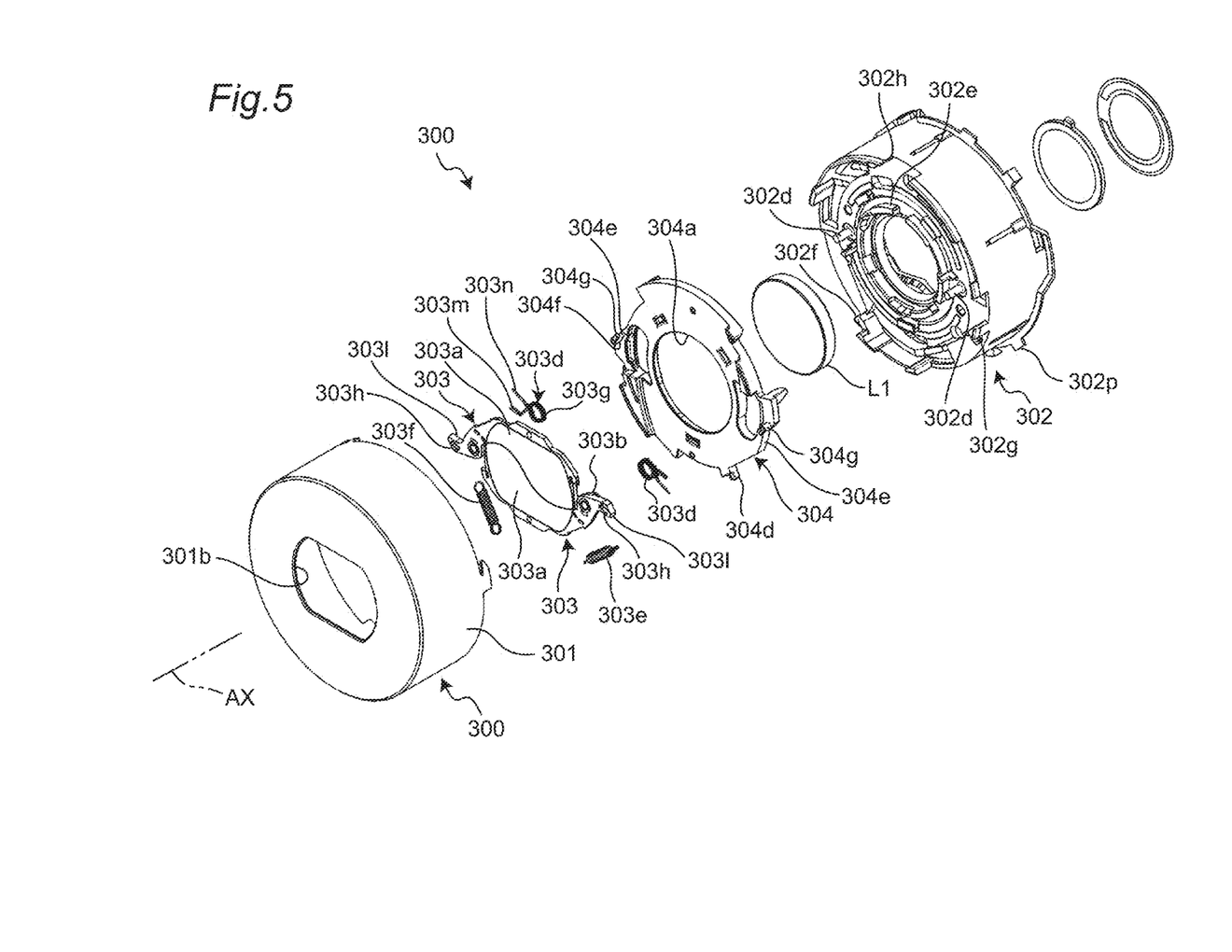
FIG. 5 is an exploded perspective view of a first group unit.
Figure 6:
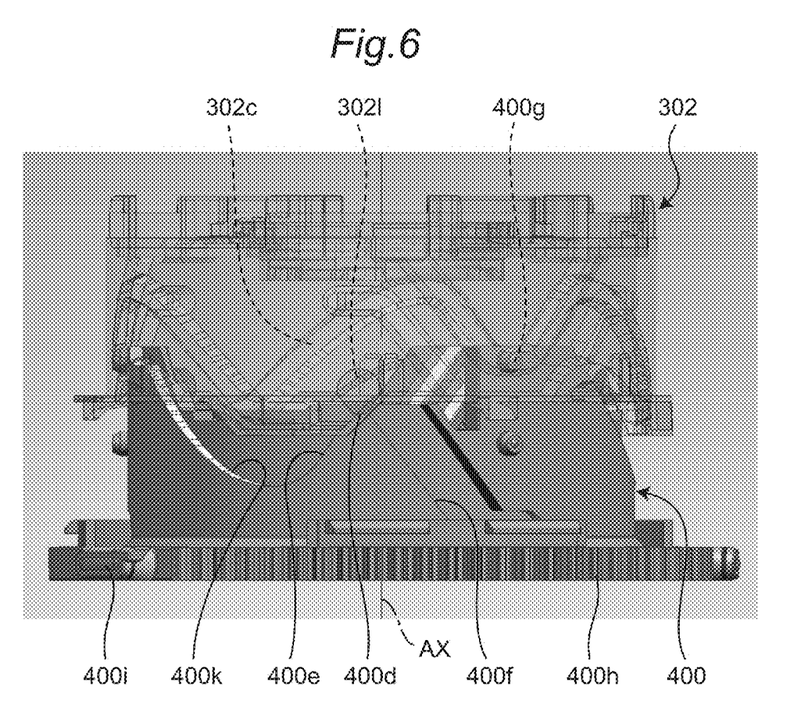
FIG. 6 is a side view of a base frame and a cam frame in the first group unit.
Figure 7:
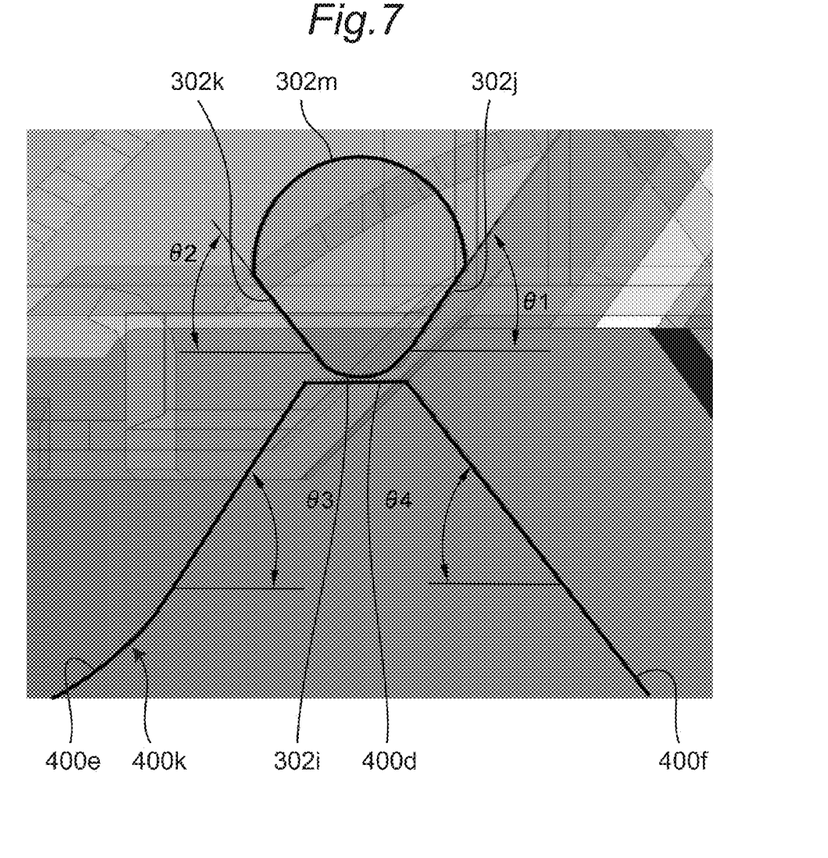
FIG. 7 is an enlarged view of a part shown in FIG. 6.
Figure 8:
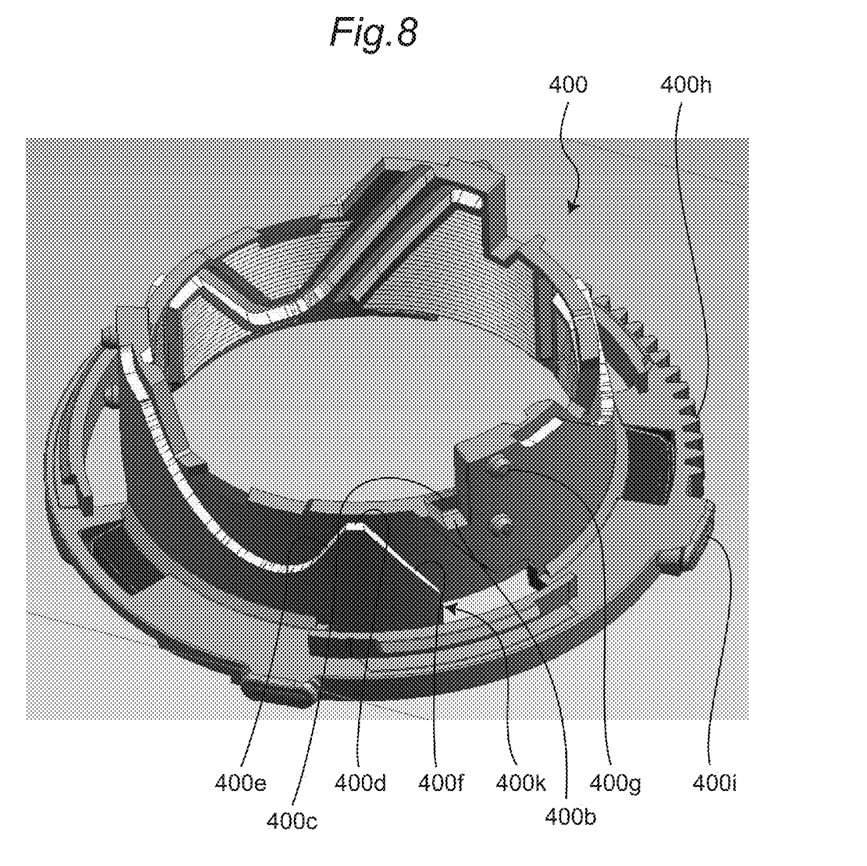
FIG. 8 is a perspective view of the cam frame.

As shown in FIG. 5, the base frame (first group frame) 302 includes: a rotary shaft 302*d*; a first diameter portion 302*e*; a third hook 302*f*; a fourth hook 302*g*; blade stopper portions 302*h*; and the rectilinear key 302*p*. As shown in FIG. 6 and FIG. 7, a cam follower 302*l* and a cam groove 302*c* are formed on an inner peripheral surface of the base frame (first group frame) 302. The cam follower 302*l* includes a first surface 302*i*, a second surface 302*j*, a third surface 302*k*, and a fourth surface 302*m*. The first surface 302*i*, the second surface 302*j* and the third surface 302*k* move along any one of a first section 400*d*, a second section 400*e* and a third section 400*f* of a cam 400*k* of the cam frame 400 shown in FIG. 8. As shown in FIG. 6, the cam follower 400*g* of the cam frame 400 is movable in the cam groove 302*c* in an engaging manner. That is, the base frame (first group frame) 302 is engaged with the cam frame 400 by the cam mechanism, and the base frame (first group frame) 302 advances or retracts in the optical axis direction when the cam frame 400 is rotated in an interlocking manner with a zooming operation or a collapsing operation.

The base frame (first group frame) 302 includes two rotary shafts 302*d* which are arranged in symmetry at an angle of 180 degrees with respect to an optical axis. The base frame (first group frame) 302 is rotatably fitted in a second diameter portion 304*a* of the cam ring 304 in the radial direction.

The rotary shafts 302*d* are formed on the base frame (first group frame) 302. Two rotary shafts 302*d* are arranged in symmetry at an angle of 180 degrees with respect to an optical axis. Rotary shaft bosses 303*b* of the barrier blades 303 are rotatably engaged with the rotary shafts 302*d* respectively.

The first diameter portion 302*e* is formed on the base frame (first group frame) 302. The first diameter portion 302*e* is fitted in the second diameter portion 304*a* in the radial direction. The third hook 302*f* is formed on the base frame (first group frame) 302. The third hook 302*f* is a hook on which a first opening spring 303*f* is mounted.

The fourth hook 302*g* is formed on the base frame (first group frame) 302. The fourth hook 302*g* is a hook on which a second opening spring 303*e* is mounted.

The blade stopper portions 302h are formed on the base frame (first group frame) 302. The blade stopper portions 302h are brought into contact with opening stopper portions 303o in a state where the barrier blades 303 are opened.

Figure 9:
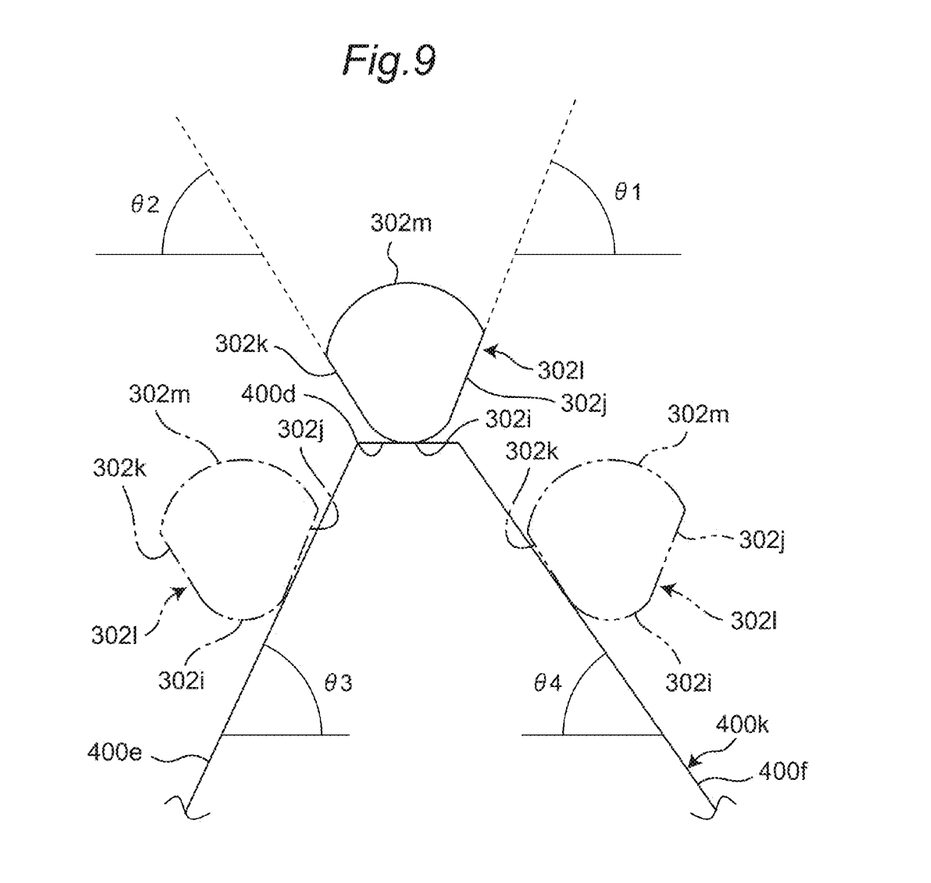
FIG. 9 is a schematic view of a cam of the cam frame and a cam follower of the base frame.

The cam follower 302l includes the first surface 302i, the second surface 302j, and the third surface 302k. Three cam followers 302l are formed on the inner peripheral surface of the base frame (first group frame) 302 in a projecting manner. As shown in FIG. 7 or FIG. 9, the third surface 302k, the first surface 302i and the second surface 302j are formed on the cam follower 302l in this order. The third surface 302k is inclined by an angle θ2 with respect to the circumferential direction (rotational direction of the cam frame 400) of a cylindrical shaft of the base frame (first group frame) 302. In the same manner, the second surface 302j is inclined by an angle θ1 with respect to the circumferential direction of the cylindrical shaft. The first surface 302i connects the second surface and the third surface to each other and has a circular arcuate shape.

When the cam follower 302l moves relative to the cam frame 400, the cam follower 302l moves along a surface of at least a portion of the cam 400k formed on the cam frame 400. The cam groove 302c is formed on the inner peripheral surface of the first group frame 302 as a cam mechanism other than the cam follower 302l. The cam groove 302c which constitutes the cam mechanism other than the cam follower 302l is engaged with the cam follower 400g of the cam frame 400. That is, due to the engagement between the cam groove 302c of the first group frame 302 and the cam follower 400g of the cam frame 400, the first group frame 302 and the cam frame 400 can be moved relative to each other in the optical axis direction.

Further, the surfaces are formed on the cam 400k of the cam frame 400 in the order of the second section 400e, the first section 400d and the third section 400f. The second section 400e is inclined at a maximum angle of θ3 with respect to the circumferential direction of the cylindrical shaft (the rotational direction of the cam frame 400). The third section 400f is inclined at a maximum angle of θ4 with respect to the circumferential direction of the cylindrical shaft. The first section 400d connects the second section 400e and the third section 400f to each other and is arranged substantially parallel to the circumferential direction.

It is preferable that the above-mentioned angles θ1, θ2, θ3 and θ4 satisfy the relationships expressed by the following formulae 1 and 2.

$$\theta 1 \geq \theta 3 \quad \text{formula 1:}$$

$$\theta 2 \geq \theta 4 \quad \text{formula 2:}$$

[3. Explanation of Manner of Operation of First Group Unit 300]

Hereinafter, the manner of operation of the first group unit having the above-mentioned constitution is explained.

When a power source of the camera is turned off, the cam frame 400 rotates such that the lens barrel 1 is retracted in the collapsing direction from an imaging state. When the cam frame 400 rotates, the base frame (first group frame) 302 approaches the cam frame 400 while rotating relative to the cam frame 400 by the cam mechanism. As a result, during a period from a point of time that the lens barrel 1 passes a wide angle end to a point of time that the lens barrel 1 reaches a collapsing end, a rotation transmission portion 400a is brought into contact with a rotation interlocking portion 304b, and the cam ring 304 rotates in the closing direction in an interlocking manner with the rotation of the cam frame 400 against a spring force of a first opening spring 303f and a spring force of the second opening spring 303e. When the cam ring 304 rotates in the closing direction, blade opening and closing bosses 304g are also rotated together with the cam ring 304, the barrier blades 303 rotate about the rotary shafts 302d in an interlocking manner with the rotation of the blade opening and closing bosses 304g thus performing an operation of closing the opening portion 301b. When the cam ring 304 is further rotated in the closing direction from a point of time that two barrier blades 303 are brought into contact with each other so that the opening portion 301b is closed, the contact between the barrier blades 303 and blade contact surfaces 304f is released and the closing spring 303d is charged and hence, the barrier blades 303 are biased in the closing direction.

On the other hand, when the power source of the camera is turned on, the cam frame 400 is rotated such that the lens barrel 1 is extended from the collapsing end. When the cam frame 400 rotates in the opening direction, due to a spring force of the first opening spring 303f and a spring force of the second opening spring 303e, the cam ring 304 rotates in the opening direction while keeping the contact of the contact portion. When the cam ring 304 rotates in the opening direction, the blade opening and closing bosses 304g also rotate together with the rotation of the cam ring 304, and the barrier blades 303 rotate about the rotary shafts 302d in an interlocking manner with the rotation of the blade opening and closing bosses 304g whereby the opening portion 301b is opened. Then, during a period until the lens barrel 1 reaches a wide angle end, the opening operation of the barrier blades 303 is stopped at a point of time where the opening stopper portion 303o of the barrier blades 303 is brought into contact with the blade stopper portion 302h of the base frame (first group frame) 302, and the rotation of the cam ring 304 in the opening direction is also stopped in an interlocking manner with the stopping of the opening operation of the barrier blade 303. When the cam frame 400 further rotates in the opening direction such that the lens barrel 1 is extended to an imaging state from such a state, the base frame (first group frame) 302 is separated from the cam frame 400 while rotating relative to the cam frame 400 by the cam mechanism. As a result, although the contact between the rotation transmission portion 400a and the rotation interlocking portion 304b is released, the cam ring 304 is biased in the opening direction due to a spring force of the first opening spring 303f and a spring force of the second opening spring 303e and hence, an open state of the barrier blades 303 is maintained during an imaging operation.

In this embodiment, the cam 400k includes: the first section 400d in which an angle which the first section 400d makes with the circumferential direction of a moving trajectory is approximately 0, the second section 400e which is continuously formed with the first section 400d and in which a maximum angle which the second section 400e makes with the circumferential direction of the moving trajectory is θ3, and the third section 400f which is continuously formed with the first section 400d on a side opposite to the second section 400e with respect to the first section 400d and in which a maximum angle which the third section 400f makes with the circumferential direction of the moving trajectory is θ4. On the other hand, the cam follower 302l includes: the first surface 302i which is formed in a conical shape or a cylindrical shape; the second surface 302j which is continuously formed with the first surface 302i and in which an angle which the second surface 302j makes with the circumferential direction is approximately θ1; and the third surface 302k which is continuously formed with the first surface 302i on a side opposite to the second surface 302j with respect to the first surface 302*i* and in which an angle which the third surface 302*k* makes with the circumferential direction is approximately θ2. The angle θ3 is set substantially equal to the angle θ1, while the angle θ4 is set substantially equal to the angle θ2.

Due to such a constitution, at a position where a trajectory of the cam has the top on the imaging object side, a flatter surface can be formed. Accordingly, drop impact strength when the cam follower is positioned at the top of the cam can be enhanced. In addition, a contact area between the cam follower and the cam can be increased. That is, in this disclosure, it is possible to provide a lens barrel having further improved quality by enhancing the drop impact strength.

Although the present disclosure has been fully described in connection with the preferred embodiments thereof with reference to the accompanying drawings, it is to be noted that various changes and modifications are apparent to those skilled in the art. Such changes and modifications are to be understood as included within the scope defined by the appended claims unless they depart therefrom.

What is claimed is:

1. A lens barrel comprising:
 a first frame having a cam follower; and
 a second frame having a cam which is engaged with the cam follower, wherein the cam includes:
 a first section which extends in a rotational direction of the second frame;
 a second section which is continuously formed with the first section and extends in an inclined manner with respect to the rotational direction of the second frame; and
 a third section which is continuously formed with the first section on a side opposite to the second section with respect to the first section and extends in an inclined manner with respect to the rotational direction of the second frame, and
 wherein the cam follower includes:
 a first surface which is arranged so as to be opposed to the first section of the cam;
 a second surface which is continuously formed with the first surface and extends in an inclined manner with respect to the rotational direction of the second frame; and
 a third surface which is continuously formed with the first surface on a side opposite to the second surface with respect to the first surface and extends in an inclined manner with respect to the rotational direction of the second frame.

2. The lens barrel according to claim 1, wherein the first surface of the cam follower is a cylindrical surface, a conical surface, or a flat surface.

3. The lens barrel according to claim 2, wherein the first surface of the cam follower is brought into contact with at least one of the first section, the second section, and the third section of the cam when a force acts at least between the first frame and the second frame.

4. The lens barrel according to claim 3, wherein the second surface of the cam follower is brought into contact with the second section of the cam at least when a force acts between the first frame and the second frame.

5. The lens barrel according to claim 4, wherein the third surface of the cam follower is brought into contact with the third section of the cam at least when a force acts between the first frame and the second frame.

6. The lens barrel according to claim 3, wherein an inclination angle of the second surface of the cam follower with respect to the rotational direction of the second frame is equal to or more than a maximum inclination angle of the second section of the cam with respect to the rotational direction of the second frame.

7. The lens barrel according to claim 6, wherein an inclination angle of the third surface of the cam follower with respect to the rotational direction of the second frame is equal to or more than a maximum inclination angle of the third section of the cam with respect to the rotational direction of the second frame.

8. The lens barrel according to claim 1, wherein the first frame is a base frame which holds a first lens group positioned on a side closest to an imaging object, and
 wherein the second frame is a cam frame which is rotatably driven by an actuator.

* * * * *